US007848350B1

(12) United States Patent
Inamdar et al.

(10) Patent No.: US 7,848,350 B1
(45) Date of Patent: Dec. 7, 2010

(54) RECORD BOUNDARY PRESERVATION PROTOCOL ENHANCEMENT

(75) Inventors: Amjad Sayedrasul Inamdar, Bijapur (IN); Jagadeesh Maiya, Bangalore (IN); Donald Frederick Schriner, Jr., Fishers, IN (US)

(73) Assignee: Cisco Technology, Inc., San Jose, CA (US)

( * ) Notice: Subject to any disclaimer, the term of this patent is extended or adjusted under 35 U.S.C. 154(b) by 585 days.

(21) Appl. No.: 11/621,007

(22) Filed: Jan. 8, 2007

(51) Int. Cl.
*H04J 3/00* (2006.01)
(52) U.S. Cl. ..................................... 370/464
(58) Field of Classification Search ........................ None
See application file for complete search history.

(56) References Cited

U.S. PATENT DOCUMENTS

| | | | |
|---|---|---|---|
| 6,144,668 A * | 11/2000 | Bass et al. | 370/401 |
| 6,320,874 B1 * | 11/2001 | Crump et al. | 370/466 |
| 6,366,583 B2 | 4/2002 | Rowett et al. | |
| 7,471,669 B1 * | 12/2008 | Sabesan et al. | 370/351 |
| 2002/0131414 A1 * | 9/2002 | Hadzic | 370/393 |
| 2002/0141395 A1 * | 10/2002 | Chang | 370/355 |
| 2003/0035439 A1 * | 2/2003 | Watanabe | 370/466 |
| 2006/0062224 A1 * | 3/2006 | Levy et al. | 370/395.6 |
| 2006/0092839 A1 * | 5/2006 | Dunko | 370/230 |
| 2007/0071000 A1 * | 3/2007 | Ulupinar et al. | 370/389 |
| 2007/0223490 A1 * | 9/2007 | Mizutani et al. | 370/395.6 |
| 2008/0056300 A1 * | 3/2008 | Williams | 370/466 |
| 2009/0034455 A1 * | 2/2009 | Lee et al. | 370/329 |

OTHER PUBLICATIONS

Cisco Systems, Inc., X.25 Record Boundary Preservation for Data Communications Networks, Cisco IOS release 12.2(8)T, pp. 1-40.
Cisco Systems, Inc., Cisco Network Solutions for the Telcon DCN: Telephone Switch Environments, 2005, pp. 1-108.
Cisco Systems, Inc., X.25 Record Boundary Preservation for Data Communications Networks, Cisco IOS release 12.2(8)T, Feb. 25, 2002, pp. 1-40.

* cited by examiner

*Primary Examiner*—Chi H Pham
*Assistant Examiner*—Fan Ng
(74) *Attorney, Agent, or Firm*—Marger Johnson & McCollom, P.C.

(57) ABSTRACT

In one embodiment, a method to exchange Q-bit data packets between TCP/IP and X.25 devices includes receiving an incoming packet sequence and translating the incoming packet sequence into at least one outgoing packet. A Q-bit indicator in the first packet of the incoming packet sequence is passed to the outgoing packets to indicate control information in the incoming packet sequence. To ensure backward compatibility, the method further includes enabling RBP Q-bit support and disabling Q-bit support by default.

22 Claims, 7 Drawing Sheets

Current RBP Header Format

| Byte | Description |
|---|---|
| Byte 1 | Protocol identifier. This byte must contain the value 0xD7 |
| Byte 2 | Protocol identifier. This byte must contain the value 0x4A |
| Bytes 3 and 4 | Payload length, in bytes, not including the header. Byte 2 contains the most significant byte of the length; byte 3 contains the least significant byte. |
| Byte 5 | More data flag(M-bit). This byte must contain one of the following values: 0x00 - Indicates that this record is the final part of the data unit. 0x01 - Indicates this record is NOT the final part of the data unit. |
| Byte 6 | Must contain the value 0x00. |

FIG. 5A

| Modified RBP header | |
|---|---|
| Byte 1 | Has a fixed value of 0xD7 (RBP protocol identifier Byte 1) |
| Byte 2 | Has a fixed value of 0x4A (RBP protocol identifier Byte 2) |
| Byte 3 | MSB of payload length |
| Byte 4 | LSB of payload length |
| Byte 5 | More data flag (M-bit) = "0" or "1" and "Q-bit" indicator = "0" or "1" |
| Byte 6 | Has a fixed value of 0x00 |

| RBP Header Byte 5 More Data and Q-bit indicator | | | | | | | |
|---|---|---|---|---|---|---|---|
| 8 | 7 | 6 | 5 | 4 | 3 | 2 | 1 |
| 0 | 0 | 0 | 0 | 0 | 0 | Q-Bit | M-Bit |

FIG. 5B

| RBP Header Byte-5 | |
|---|---|
| Value | Meaning |
| 0x00 | Q = 0, M = 0 |
| 0x01 | Q = 0, M = 1 |
| 0x02 | Q = 1, M = 0 |
| 0x03 | Q = 1, M = 1 |
| 0x04 - 0xFF | Not allowed |

FIG. 7

RECORD BOUNDARY PRESERVATION PROTOCOL ENHANCEMENT

TECHNICAL FIELD

The present disclosure relates generally to internetworking, and more particularly to Record Boundary Preservation (RBP) protocol to exchange data packets between X.25 and Transmission Control Protocol/Internet Protocol (TCP/IP) hosts.

BACKGROUND

X.25 is a protocol standard for Wide Area Network (WAN) communications that defines how connections between users devices and network devices are established and maintained. RBP is a protocol over TCP/IP that allows delimiting logical record boundaries and adds support for conveying logical records between a TCP/IP host using this protocol and an X.25 host using the X.25 M-bit (the "more data" flag in a X.25 data packet) to mark record boundaries. In other words, RBP protocol defines a way for hosts using TCP/IP based protocols to exchange data with devices that use X.25 protocol while preserving the logical record boundaries conveyed by the X.25 M-bit. RBP protocol translates data conveyed over a TCP session into one or more RBP packets, hence the TCP/IP packets, by appending a 6-byte RBP header to the data portion of each TCP/IP packet that specifies the amount of data following and indicates whether data in this packet is considered the final part of a logical record. The 6-byte RBP header is located at the start of the data portion of a TCP/IP packet.

RBP protocol was developed to enable the Telco Data Communication Network (DCN) Service Provider customers to migrate from the legacy X.25 DCNs to IP-based DCNs while maintaining the legacy X.25 equipment at one end. The original RBP protocol does not support conveyance of Q-bit data packets between X.25 and TCP/IP hosts. Q-bit data packets are packets with the "qualified" bit set to indicate that the packets carry control information rather than user data. Receipt of a X.25 Q-bit data packet terminates the corresponding X.25 and TCP connections in the original RBP implementation.

DESCRIPTION OF EXAMPLE EMBODIMENTS

Overview

A method to receive incoming packets and to translate the incoming packets into outgoing packets, further includes passing a Q-bit indicator in a first packet of an incoming packet sequence to the corresponding outgoing packet sequence, to indicate control information in the incoming packet sequence. The method also includes enabling RBP Q-bit support.

A system includes a first digital device and a second digital device at a remote end of a data communication channel. A router coupled to the first digital device is configured to receive incoming packets and translates the incoming packets into outgoing packets. The router is also configured to pass a Q-bit indicator in the incoming packet sequence to the outgoing packets to indicate control information. The router is further configured to enable RBP Q-bit support.

BRIEF DESCRIPTION OF THE DRAWINGS

The foregoing and other objects, advantages and features will become more readily apparent by reference to the following detailed descriptions in conjunction with the accompanying drawings.

DESCRIPTIONS

Figure 1:
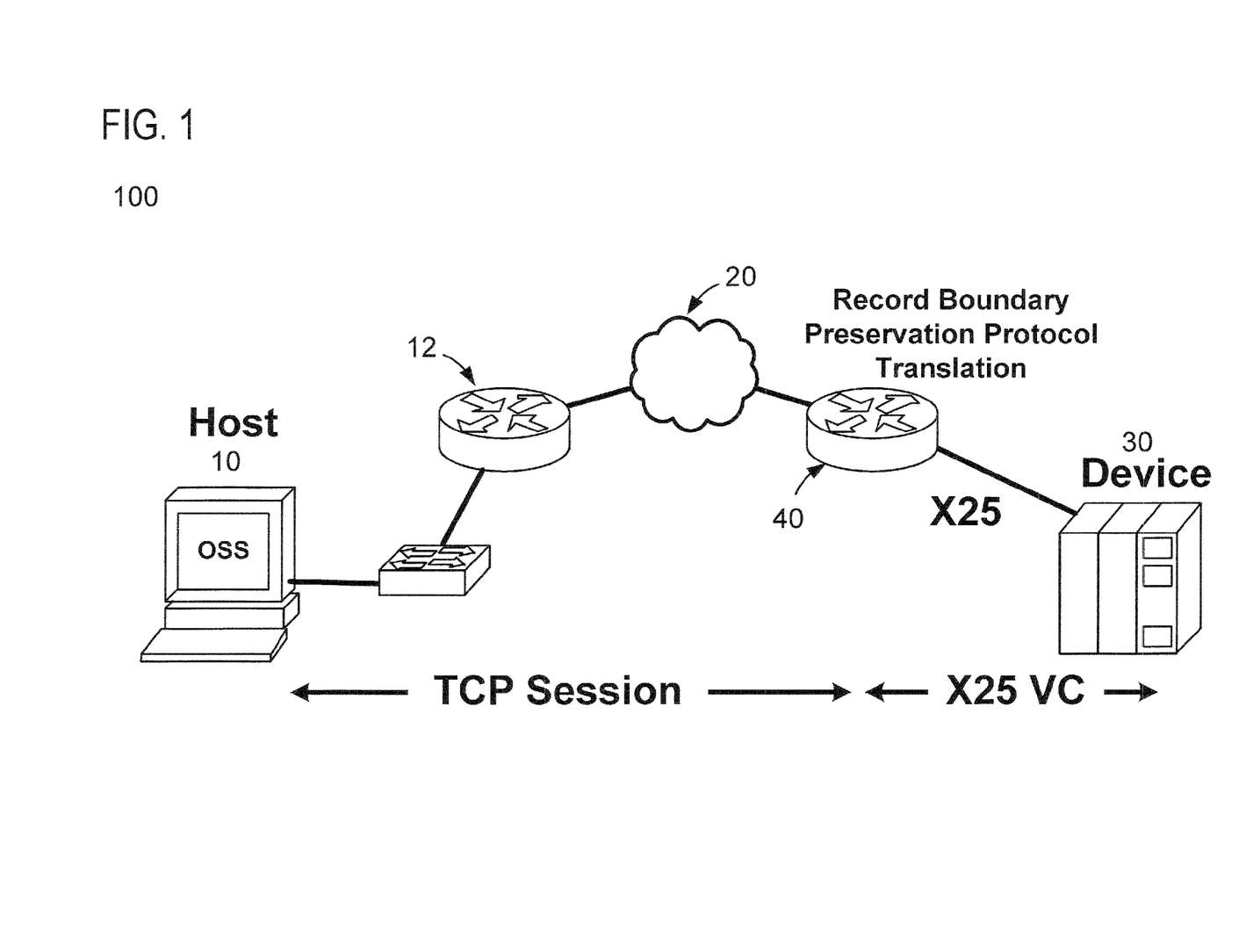
FIG. 1 is a schematic block diagram illustrating an example network configuration for the RBP enhancement.

FIG. 1 is a schematic block diagram illustrating an example network configuration for the RBP enhancement.

Referring to FIG. 1, host 10 may be a mainframe, a minicomputer, a workstation, or any other digital device, which is configured as an Operation Support System (OSS). One example OSS is Intec Telecom. System's Inter-mediaE application. The Inter-mediaE application collects the Call Detail Records (CDR). The RBP enhancement, which will be explained later, allows collection of Call Detail Records using the Q-bit in a RBP header to indicate control information. Call Detail Records collection enables service providers to generate bills for their customers. Host 10 is connected to an intermediate router 12 via a TCP/IP interface. A TCP session is established between the host 10 and the router 40. Other OSS that might use the Q-bit feature includes provisioning new customers and services, collecting traffic engineering data, and monitoring a Class 5 telephone switch over the DCN.

The middle portion of the diagram shows the IP backbone 20, which may comprise a core set of intermediate devices and a set of distribution intermediate devices that are not shown explicitly herein.

The right side of the diagram is a digital device 30. The digital device can be a class 4 or 5 telephone switch or any other legacy device that uses the X.25 or BX25 protocol for monitoring, provisioning, and collection of billing data (BX 25 is a variant of X.25 that was developed by Bellcore). One example of a Class 5 telephone switch is Lucent's 5ESS. An X.25 virtual circuit connection is established between the device 30 and the router 40.

Router 40 is any digital device who is dedicated to the task of routing messages between network protocols and between different networks having similar protocols. Routers must contain the necessary input and output connections for linking different network systems together. Each router also has an internal computer architecture and associated control circuitry for converting data packets between different network protocols. Please refer to U.S. Pat. No. 6,366,583 for a more detailed explanation of router architecture.

In this instance, router 40 is configured with RBP protocol to enable data exchange between the device 30 and the host 10, while preserving logical record boundaries by using the More data flag or RBP M-bit in a RBP header. The solution is done without carrying the full X.25 protocol over the TCP session.

Figure 2:
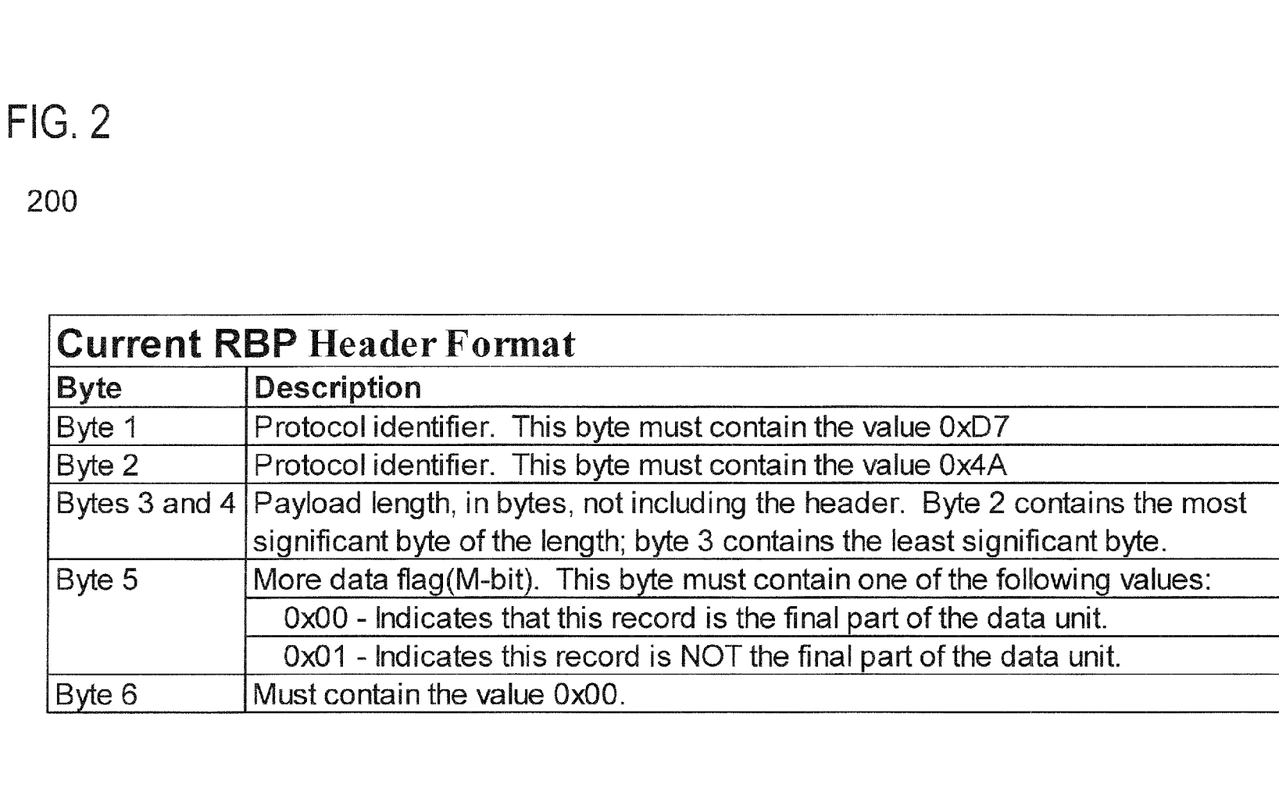
FIG. 2 is a table diagram illustrating the current RBP header format without RBP Q-bit support.

FIG. 2 describes the format and contents of a known or current RBP header without the RBP enhancement. The current RBP header has 6 bytes in total, in which bytes 1 and 2 contain a protocol identifier (for validation); byte 1 must contain the value 0xD7 and byte 2 must contain the value 0x4A; bytes 3 and 4 contain the payload length in bytes (excluding the record header), most significant byte first; byte 5 contains the More data flag or M-bit, which must contain either 0x00 or 0x01, indicating that the data contained in this packet is (0x00) or is not (0x01) the final part of a data unit; byte 6 must contain 0x00.

The following sections describe how RBP generally operates to support data exchange between X.25 device and TCP/IP hosts, such as device 30 and host 10 in FIG. 1. We then explain an example RBP enhancement to support the exchange of Q-bit data packets.

When router 40 configured with RBP receives an incoming X.25 call that matches a configured X.25 RBP map, the router 40 attempts to open a TCP connection with the specified TCP destination, e.g., host 10. Each TCP session is mapped to one X.25 virtual circuit. After the TCP session is established, router 40 translates the incoming X.25 data packets associated with the incoming X.25 call into one or more outgoing packets before forwarding the outgoing packets to the TCP destination.

Figure 3:
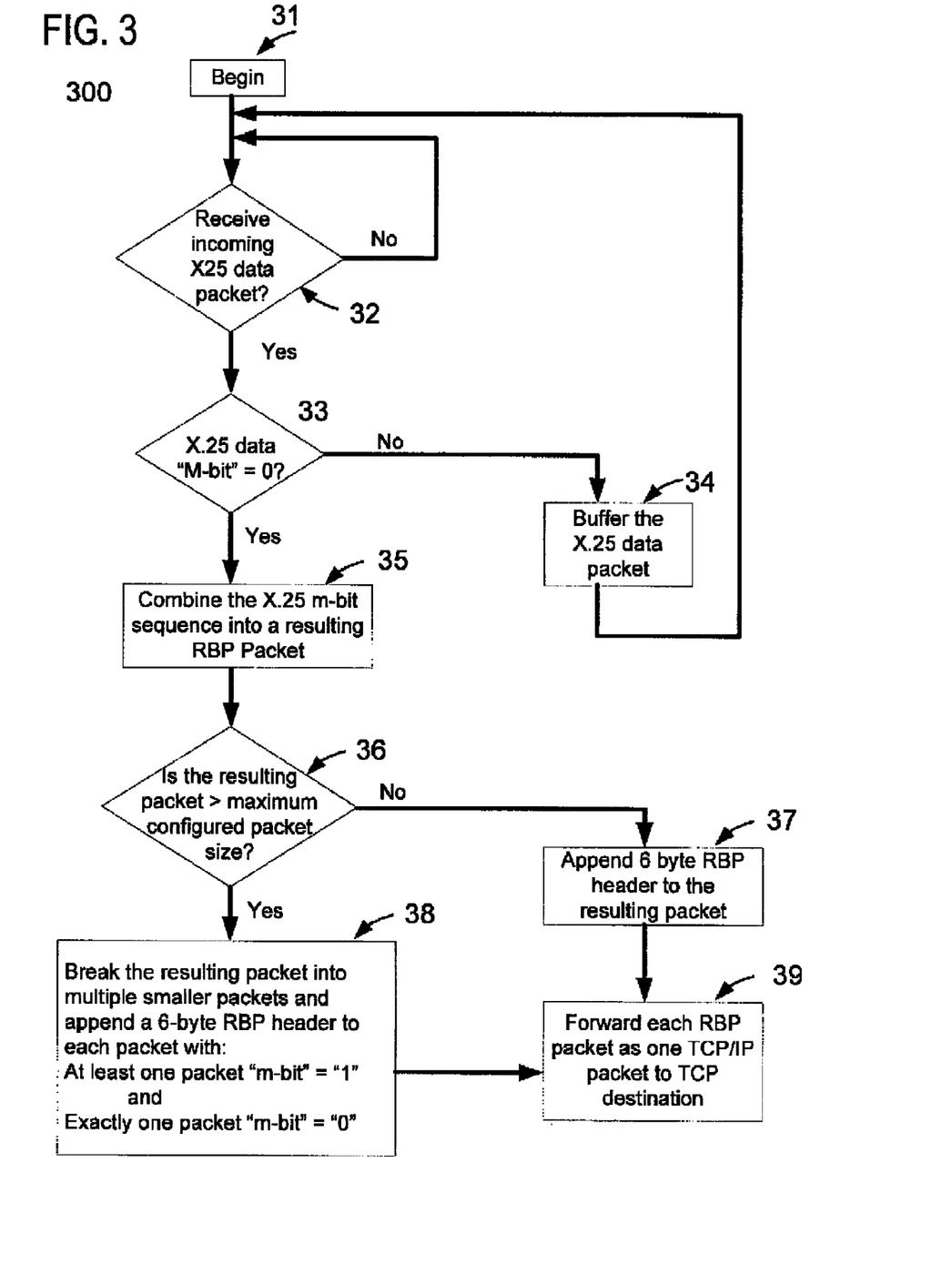
FIG. 3 is a flow chart illustrating an example method to exchange data between X.25 and TCP/IP hosts for an incoming X.25 call in the network configuration of FIG. 1.

FIG. 3 is a flow chart illustrating an example method 300 to exchange data between X.25 and TCP/IP hosts for an incoming X.25 call in the network configuration in FIG. 1.

Referring to FIG. 3, the method 300 begins at step 31. At step 32, the method 300 inquires whether a X.25 data packet is received. If there isn't any X.25 data packet received, the method goes back to the step 31. On the other hand, if a X.25 data packet is received, at step 33, it would inquire whether the received X.25 data packet has its X.25 M-bit set to "0". If the answer is no, then the router 40 buffers the X.25 data packet received at step 34 until it receives a X.25 packet with its X.25 M-bit set to "0". A X.25 data packet with its X.25 M-bit set to "1" indicates there are more data following it and this is not the last packet in a complete X.25 m-bit sequence. On the other hand, a X.25 packet with its X.25 M-bit set to "0" indicates it is the last packet for a complete X.25 m-bit sequence. A complete X.25 m-bit sequence consists of zero or more X.25 data packets with the corresponding X.25 M-bit set to "1" followed by exactly one X.25 data packet with the X.25 M-bit set to "0".

If a X.25 data packet with the X.25 M-bit set to "0" is received, then at steps 35, 36, and 37, a complete X.25 m-bit sequence is translated to a single RBP packet by appending a 6-byte RBP header to the RBP packet as long as the resulting RBP packet does not exceed the configured maximum RBP packet size or, if a maximum RBP packet size was not configured, the TCP maximum segment size. In this situation, the More data flag (or RBP M-bit) in the RBP header is set to "0", indicating that this RBP packet is the final part of the resulting RBP packet sequence or the corresponding X.25 m-bit sequence.

On the other hand, if the resulting RBP packet exceeds the configured maximum RBP packet size, then according to step 38, the resulting RBP packet is broken into multiple smaller RBP packets with each packet falling within the maximum RBP packet size. Each RBP packet is appended with a 6-byte RBP header. Here, at least one of the packets has its More data flag or RBP M-bit is set to "1", indicating the packet or packets is/are not the final part of the resulting RBP packet sequence or the corresponding X.25 m-bit sequence. This packet or series of packets is/are followed by a packet whose More data flag or RBP M-bit is set to "0".

According to step 39, the RBP packets are forwarded as TCP/IP packets to the desired TCP destination. This process of translating incoming X.25 data packets into RBP packets, hence outgoing TCP/IP packets, results in a series of zero or more outgoing TCP/IP packets whose More data flag or RBP M-bit in the RBP header is set to "1" followed by an outgoing TCP/IP packet whose More data flag or RBP M-bit in the RBP header is set to "0". The 6-byte RBP header in each RBP packet, hence in the outgoing TCP/IP packet, preserves the logical record boundaries conveyed by the X.25 M-bit. The 6-byte RBP header is not used for the establishment of TCP connection/disconnection between router 40 and host 10.

Router 40 does not split an X.25 data packet across multiple RBP packets (and hence multiple TCP/IP packets) unless the X.25 data packet exceeds the configured maximum RBP packet size; however, TCP may segment the data stream at arbitrary byte boundaries in accordance with TCP specifications.

The 6-byte RBP header is maintained in both directions. For example, before host 10 sends an OSS application data message in TCP/IP packets to router 40, it inserts a 6-byte RBP header into each TCP/IP packet. The More data flag or RBP M-bit in the RBP header of each TCP/IP packet is set to "0" if the TCP/IP packet contains the final part of an entire OSS application data message. Otherwise, the More data flag or RBP M-bit is set to "1".

If an OSS application data message exceeds the message length that the transmission buffer size on either side of the router 40 can support, the OSS application data message is broken into multiple smaller TCP/IP packets. At least one of the TCP/IP packets whose More data flag or RBP M-bit in the RBP header is set to "1", indicating the data in this TCP/IP packet is not the final part of the OSS application data message. This is followed by a TCP/IP packet whose More data flag or RBP M-bit is set to "0". In concept this is similar to X.25 M-bit, except here that the More data flag or RBP M-bit in the RBP header of each TCP/IP packet is used to break down one big OSS application data message into smaller TCP/IP packets.

Figure 4:
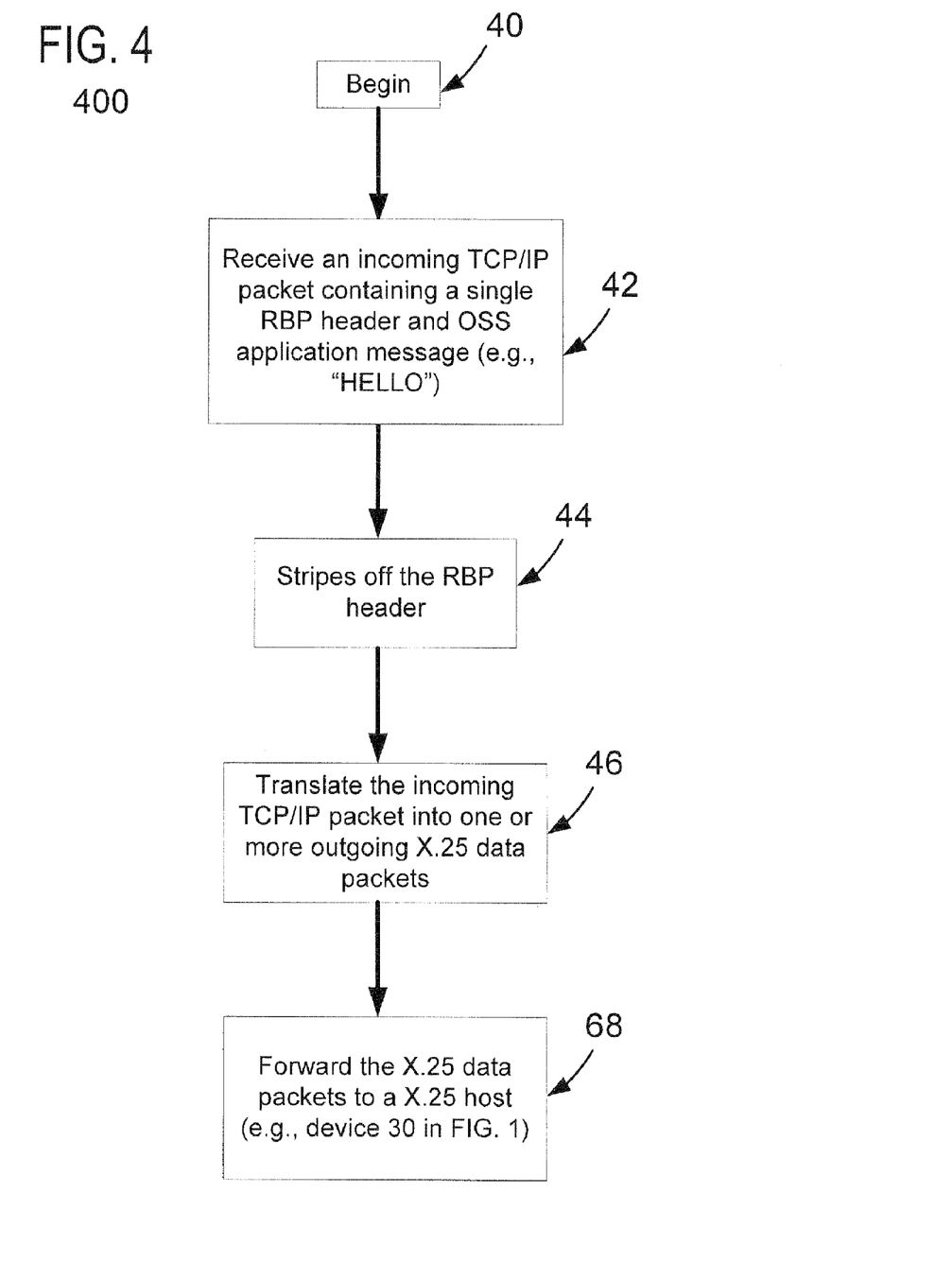
FIG. 4 is a flow chart illustrating an example method to exchange data between X.25 and TCP/IP host for an incoming TCP/IP packet in the network configuration of FIG. 1.

FIG. 4 is a flow chart illustrating an example method 400 to exchange data between X.25 and TCP/IP hosts for incoming TCP/IP data packets in the network configuration of FIG. 1. The method 400 begins at 40. At step 42, an incoming TCP/IP data packet is received. The data portion of the TCP/IP data packet contains a single 6-byte RBP header and a portion of an entire OSS application data message or an entire OSS application data message. At step 44, the 6-byte RBP header is stripped off from the TCP/IP packet. At step 46, based on the information in the RBP header, the incoming TCP/IP packet is translated into one or more outgoing X.25 data packets. At step 48, the outgoing X.25 packets are forwarded to an X.25 device on a X.25 connection.

The data contained in each TCP/IP packet is interpreted as a fixed-length RBP header (6-byte) followed by a variable-length payload whose length is specified in the RBP header. If the protocol ID or flag field in the header is invalid, the TCP connection will be closed and the corresponding X.25 circuit will be cleared or reset. The payload length may be greater than the X.25 packet size and need not be a multiple of the X.25 packet size.

This process results in a sequence of maximum-sized X.25 data packets, each with the X.25 M-bit set to "1", followed by a X.25 data packet containing the remaining data whose X.25 M-bit is set to "0". As the incoming TCP/IP packets are translated into outgoing X.25 data packets, the outgoing X.25 packets are forwarded to the device 30 on the X.25 connection.

In another example, an OSS application data string or message may be broken into multiple smaller TCP/IP packets if the length of the application data is bigger than that can be fit into the 2-byte length indicator in the RBP header. An opposite example is an OSS application data less than or equal to 1026 bytes that are exchanged between an OSS Application and a Class 5 switch. In this case, the More data flag or RBP M-bit in the corresponding RBP header is set to "0".

The following example illustrates that the host 10 sends an application message "HELLO" to the device 30. The OSS application message "HELLO" is 11 bytes in total, with the first 6 bytes being the RBP header, and the remaining 5 bytes being the "HELLO" message (See below example). The 11-byte OSS application message is stored in the data portion of the TCP data packet and is sent over the TCP/IP interface.

Byte 1=0xD7

Byte 2=0x4A

Byte 3=0x00

Byte 4=0x05

Byte 5=0x00

Byte 6=0x00

Byte 7='H'=0x48

Byte 8='E'=0x45

Byte 9='L'=0x4C

Byte 10='L'=0x4C

Byte 11='O'=0x4F

The router 40 strips off the 6-byte RBP header and sends the remaining 5 bytes to the device 30 over the X.25 interface. The exact opposite is done in the other direction, as explained above in FIG. 3. In other words, the router 40 appends a 6-byte header to the "HELLO" message received from an incoming X.25 connection and sends it over a TCP connection to host 10.

The router 40 buffers any data received from the TCP session while waiting for the corresponding X.25 connection to be established. If the connection attempt fails, the data is discarded and the TCP session will be torn down, i.e., terminated. On the other hand, when the TCP connection is closed, the X.25 circuit will be cleared or reset, and the remaining data yet to be sent on the X.25 circuit is discarded.

The following sections describe an example modification to the 6-byte RBP header to accommodate Q-bit data packet or control frames while ensuring backward compatibility with the existing RBP implementation. As explained previously, Q-bit indicates that a data packet carries control information as opposed to user data.

Figure 5A:
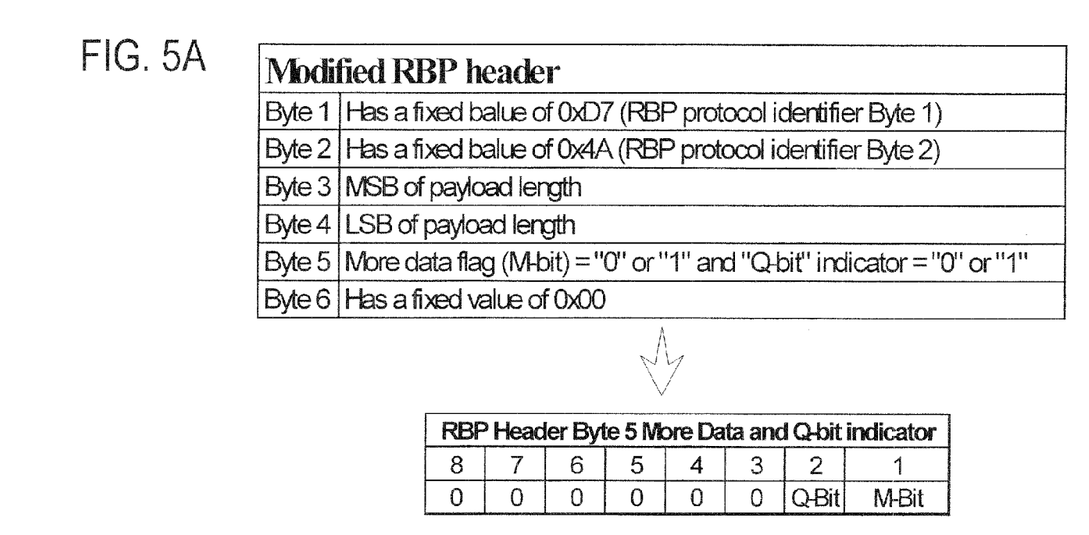
FIG. 5A is a table diagram illustrating a modified RBP header format for RBP Q-bit support.

FIG. 5A illustrates a modified RBP header to support the conveyance of Q-bit data packets between the host 10 and the device 30. The current RBP header is modified to include a RBP Q-bit indicator which signifies control information. All other bytes in the RBP header remain the same as the original RBP header format shown in FIG. 2. Specifically in FIG. 5A, the RBP Q-bit indicator is defined in bit-2 byte-4 of the modified RBP header.

Figure 5B:
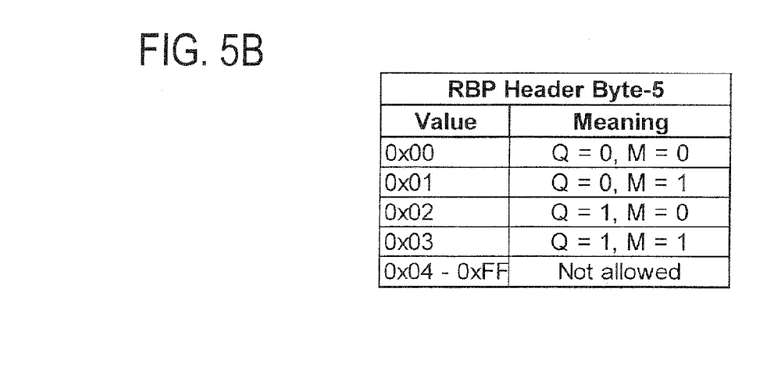
FIG. 5B is a diagram illustrating the combination of the Q-bit and M-bit indicators in the modified RBP header of FIG. 5A.

FIG. 5B shows different values for the combination of the RBP M-bit and the RBP Q-bit indicators in the modified RBP header. The RBP Q-bit indicator is set to "0" or "1", with "1" indicating that the data packet carries control information, and "0" indicating that the data packet carries user data. As explained previously, the RBP M-bit indicator can be set to "0" or "1", with "1" indicating that there are more data following and this is not the last part of a data unit, and "0" indicating that this is the final part of a data unit. With the modification, byte-5 of the RBP header must contain the value 0x00, 0x01, 0x02, or 0x03.

The following examples further explain RBP Q-bit implementation to support data exchange between X.25 and TCP/IP hosts:

When a single incoming X.25 data packet from a X.25 host is translated into a single RBP packet, hence a single outgoing TCP/IP packet, to a TCP/IP host, the X.25 Q-bit value from the X.25 packet is passed on to the RBP Q-bit indicator in the RBP header of the outgoing TCP/IP packet. In this case, the RBP M-bit indicator in the RBP header of the outgoing TCP/IP packet is set to "0".

When multiple incoming X.25 data packets from a X.25 host are translated to a single RBP packet, hence a single outgoing TCP/IP packet, to a TCP/IP host, the Q-bit value from the first X.25 packet of the incoming X.25 packet sequence is passed onto the RBP Q-bit indicator in the RBP header of the outgoing TCP/IP packet. In this case, the RBP M-bit indicator in the RBP header of the outgoing TCP/IP packet is set to "0".

When multiple incoming X.25 data packets from a X.25 host is translated to single RBP packet that is too large to be forwarded to a TCP/IP host in a single outgoing TCP/IP packet, the Q-bit value from the first X.25 packet of the incoming X.25 packet sequence is used as the RBP Q-bit indicator value in the RBP header for each TCP/IP packet of the outgoing TCP/IP packet sequence. In this case, the RBP M-bit indicator in the RBP header is set to "1" for all the packets in the outgoing TCP/IP packet sequence except for the last outgoing TCP/IP packet, whose RBP M-bit indicator in the RBP header is set to "0".

When a single incoming TCP/IP data packet from a TCP/IP host to a X.25 host is translated to a single outgoing X.25 packet, the RBP Q-bit indicator value in the RBP header of the TCP/IP packet is passed on to the X.25 Q-bit in the outgoing X.25 packet. In this case, the X.25 M-bit of the outgoing X.25 packet is set to "0".

When multiple incoming TCP/IP data packets from a TCP/IP host to a X.25 host is translated to a single outgoing X.25 packet, the RBP Q-bit indicator value from the RBP header in the first TCP/IP packet of the incoming packet sequence is used as the X.25 Q-bit value for the outgoing X.25 packet. In this case, the X.25 M-bit value is set to "0" in the outgoing X.25 packet.

When multiple incoming TCP/IP data packets from a TCP/IP host is translated to a single RBP packet that is too large to be forwarded to a X.25 host in a single X.25 packet, the RBP Q-bit indicator value in the RBP header from the first TCP/IP packet of the incoming TCP/IP packet sequence is used as the X.25 Q-hit indicator value for the outgoing X.25 packet sequence. In this case, the X.25 M-bit is set to "1" for all X.25 packets in the outgoing X.25 packet sequence except for the last outgoing X.25 packet, whose X.25 M-bit is set to "0".

The above examples indicate that the router 40 will simply pass the Q-bit indicator transparently between X.25 and TCP/IP hosts without any further action. The methods described in FIGS. 3 and 4 remain applicable after the modification to the RBP header.

A new option 'q-bit' is added to the existing RBP interface mode configuration commands to configure router 40 for passing the Q-Bit data packets between TCP and X.25 sessions. The following lists the RBP interface commands:

x25 map rbp X.121-address [cud string] local port port [options]
x25 map rbp X.121-address [cud string] remote host ip-address port port [options]
x25 pvc circuit rbp local port port [options]
x25 pvc circuit rbp remote host ip-address port port [options]

The new Q-bit option is:

q-bit Enable RBP Q-bit support

Below is an example configuration for incoming TCP connections:

Intermediate device#conf t

Enter configuration commands, one per line. End with CNTL/Z.

Intermediate device(config)#int serial 0/0

Intermediate device(config-if)#x25 map rbp 1111 local port 9999 ?
    cug Specify a Closed User Group number
    packetsize Request data packet sizes for originated calls
    q-bit Enable RBP Q-bit support
    recordsize Specify maximum record size for session
    reverse Use reverse charging on originated calls
    roa Specify ROA
    throughput Request bandwidth in X.25 network
    transit-delay Specify transit delay (msec)
    windowsize Request window sizes for originated calls
    <cr>

Intermediate device(config-if)#x25 map rbp 1111 local port 9999 q-bit

Intermediate device(config-if)#

Another example configuration for incoming X.25 connections:

Intermediate device#conf t

Enter configuration commands, one per line. End with CNTL/Z.

Intermediate device(config)#int serial 0/0

Intermediate device(config-if)#x25 map rbp 1111 remote host 9.2.72.71 port 9999 ?
    accept-reverse Accepting incoming reverse-charged calls
    q-bit Enable RBP Q-bit support
    recordsize Specify maximum record size for session
    source-interface Specify source interface for TCP session
    <cr>

Intermediate device(config-if)#x25 map rbp 1111 remote host 9.2.72.71 port 9999 qbit Intermediate device(config-if)#

The RBP Q-bit support is disabled by default and is enabled by explicitly specifying the 'q-bit' option in the RBP configuration commands. This addition of RBP Q-bit option to the existing RBP parser syntax ensures backward compatibility with the existing RBP implementation.

Figure 6:
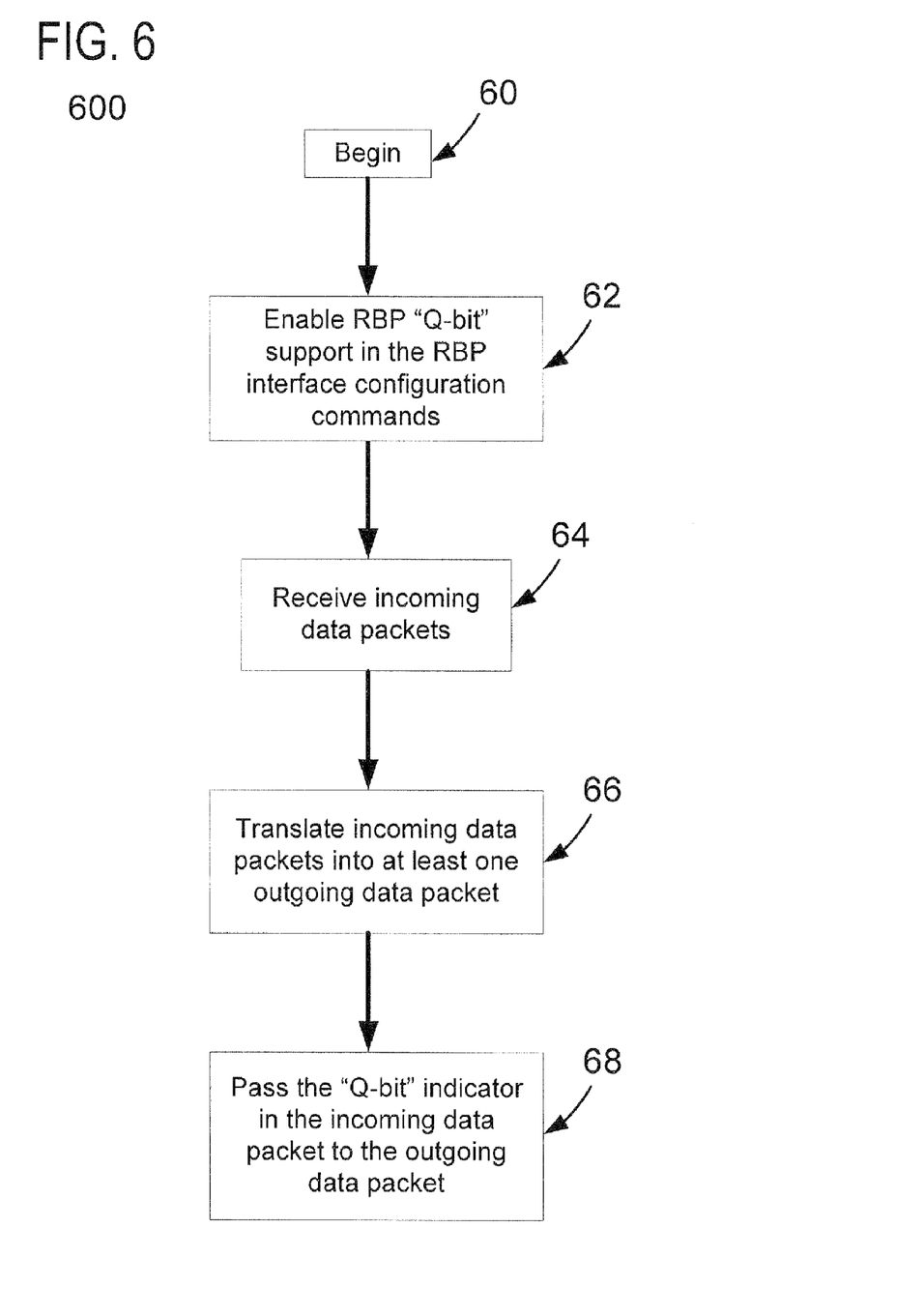
FIG. 6 is a flow chart illustrating an example method to exchange Q-bit data packets between X.25 and TCP/IP hosts in accordance with the modified RBP header in FIG. 5A.

FIG. 6 is a flow chart illustrating an example method to exchange Q-bit data packets between X.25 and TCP/IP hosts in accordance with the modified RBP header disclosed above. The method can be implemented in the router device 40.

In step 62, RBP Q-bit support is enabled. At steps 64 and 66, an incoming packet sequence is received and is translated to at least one or more outgoing packets. At step 68, the Q-bit indicator value in the first packet of the incoming packet sequence is passed onto the outgoing data packets.

Figure 7:
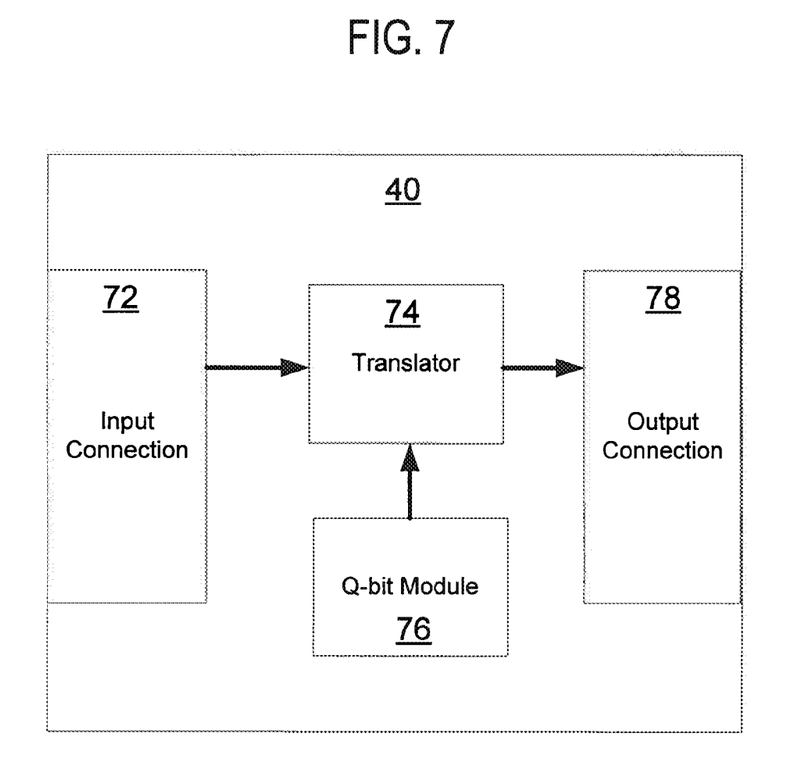
FIG. 7 is a schematic block diagram illustrating a detailed example of the router 40 presented in FIG. 1.

FIG. 7 is a schematic block diagram illustrating a detailed example of the router 40 presented in FIG. 1. In the example, the router 40 has an input connection 72 that may receive one or more incoming packets from either the host 10 or the digital device 30 through either a X.25 connection or a TCP/IP connection. The router 40 also has a translator 74 that may translate between one or more X.25 data packets and one or more TCP/IP data packets. Each TCP/IP data packet may contain a record boundary preservation (RBP) header and a single data record.

In the example, the router 40 has a Q-bit module 76 that may be used to pass a Q-bit indicator in a first packet of the incoming packet sequence to one or more outgoing packets to indicate control information in the incoming packet sequence and also to enable Q-bit support. The router 40 also has an output connection 78 that may forward the outgoing packet(s) to either the host 10 or the digital device 30 through the other of the X.25 connection and the TCP/IP connection. If the input connection 72 receives the incoming packet(s) from the host 10 through the TCP/IP connection, for example, the output connection 78 would forward the outgoing packet(s) to the digital device 30 through the X.25 connection.

Having described the example embodiments, it should be apparent that a person skilled in the art can make modifications and variations in light of the above teachings. Therefore, any changes to the disclosed embodiments will be within the scope and the spirit of the claims.

The invention claimed is:

1. A method comprising:
    a router receiving an incoming packet sequence from one of a X.25 connection and a Transmission Control Protocol and Internet Protocol (TCP/IP) connection, where the incoming packet sequence has at least one incoming packet;
    the router translating the incoming packet sequence into at least one outgoing packet, the translating comprising translating between multiple X.25 data packets and one or more TCP/IP data packets, each of the one or more TCP/IP data packets containing a record boundary preservation (RBP) header and a single data record;
    the router passing a M-bit indicator and a Q-bit indicator in a first packet of the incoming packet sequence to the at least one outgoing packet, the M-bit indicator indicating whether the first packet of the incoming packet sequence is a last packet of the incoming packet sequence, and the Q-bit indicator indicating control information in the incoming packet sequence;
    the router forwarding the at least one outgoing packet onto the other of the X.25 connection and the TCP/IP connection; and
    the router enabling RBP Q-bit support.

2. The method of claim 1, in which the Q-bit indicator is set to either "0" or "1".

3. The method of claim 1, in which the Q-bit indicator is defined in bit-2 byte-5 of a 6-byte RBP header.

4. The method of claim 1, the one or more TCP/IP data packets comprising a single TCP/IP data packet containing a RBP header and a single data record.

5. The method of claim 1, the multiple X.25 data packets comprising incoming X.25 data packets and the one or more TCP/IP data packets comprising multiple TCP/IP data packets, where each of the multiple TCP/IP data packets contains a RBP header and a portion of a single data record.

6. A method comprising:
a router receiving an incoming packet sequence from one of a X.25 connection and a Transmission Control Protocol and Internet Protocol (TCP/IP) connection, where the incoming packet sequence has at least one incoming packet;
the router translating the incoming packet sequence into at least one outgoing packet, the translating comprising translating between a single X.25 data packet and multiple TCP/IP data packets, where each of the multiple TCP/IP data packets contains a record boundary preservation (RBP) header and a portion of a single data record;
the router passing a M-bit indicator and a Q-bit indicator in a first packet of the incoming packet sequence to the at least one outgoing packet, the M-bit indicator indicating whether the first packet of the incoming packet sequence is a last packet of the incoming packet sequence, and the Q-bit indicator indicating control information in the incoming packet sequence;
the router forwarding the at least one outgoing packet onto the other of the X.25 connection and the TCP/IP connection; and
the router enabling RBP Q-bit support.

7. The method of claim 1, in which enabling RBP Q-bit support comprises selecting a Q-bit option in RBP interface mode configuration commands.

8. The method of claim 1, which further comprises the router disabling the RBP Q-bit support by default.

9. The method of claim 6, in which the Q-bit indicator is set to either "0" or "1".

10. The method of claim 9, the multiple X.25 data packets comprising incoming X.25 data packets.

11. The method of claim 6, in which the Q-bit indicator is defined in bit-2 byte-5 of a 6-byte RBP header.

12. The method of claim 6, in which enabling RBP Q-bit support comprises selecting a Q-bit option in RBP interface mode configuration commands.

13. The method of claim 6, which further comprises the router disabling the RBP Q-bit support by default.

14. A networking device coupled between a host and a digital device, comprising:
an input connection configured to receive at least one incoming packet of an incoming packet sequence from one of the host and the digital device through one of a X.25 connection and a TCP/IP connection;
a translator configured to translate between multiple X.25 data packets and one or more TCP/IP data packets, each of the one or more TCP/IP data packets containing a record boundary preservation (RBP) header and a single data record, the RBP header comprising a M-bit indicator to indicate whether the corresponding TCP/IP data packet is a last packet of the incoming packet sequence;
an output connection configured to forward at least one output packet to the other of the host and the digital device through the other of the X.25 connection and the TCP/IP connection; and
a Q-bit module configured to pass a Q-bit indicator in a first packet of the incoming packet sequence to the at least one outgoing packet to indicate control information in the incoming packet sequence and to enable Q-bit support.

15. The networking device of claim 14, the one or more TCP/IP data packets comprising a single TCP/IP data packet containing a RBP header and a single data record.

16. The networking device of claim 14, the multiple X.25 data packets comprising incoming X.25 data packets and the one or more TCP/IP data packets comprising multiple TCP/IP data packets, where each of the multiple TCP/IP data packets contains a RBP header and a portion of a single data record.

17. The networking device of claim 14, in which the Q-bit indicator is defined in bit-2 byte-5 of a 6-byte RBP header.

18. The networking device of claim 14, in which the Q-bit module is configured to enable RBP Q-bit support by selecting a Q-bit option in RBP interface mode configuration commands.

19. A networking device coupled between a host and a digital device, comprising:
an input connection configured to receive at least one incoming packet of an incoming packet sequence from one of the host and the digital device through one of a X.25 connection and a TCP/IP connection;
a translator configured to translate between a single X.25 data packet and multiple TCP/IP data packets, where each of the multiple TCP/IP data packets contains a record boundary preservation (RBP) header and a portion of a single data record, the RBP header comprising a M-bit indicator to indicate whether the corresponding TCP/IP data packet is a last packet of the incoming packet sequence;
an output connection configured to forward at least one output packet to the other of the host and the digital device through the other of the X.25 connection and the TCP/IP connection; and
a Q-bit module configured to pass a Q-bit indicator in a first packet of the incoming packet sequence to the at least one outgoing packet to indicate control information in the incoming packet sequence and to enable Q-bit support.

20. The networking device of claim 19, in which the Q-bit indicator is defined in bit-2 byte-5 of a 6-byte RBP header.

21. The networking device of claim 19, in which the Q-bit module is configured to enable RBP Q-bit support by selecting a Q-bit option in RBP interface mode configuration commands.

22. A method comprising:
a router receiving an incoming packet sequence, where the incoming packet sequence has at least one incoming packet;
the router translating the incoming packet sequence into at least one outgoing packet, in which translating the incoming packet sequence into at least one outgoing packet comprises translating between multiple X.25 data packets and a single TCP/IP data packet containing a record boundary preservation (RBP) header and a single data record;
the router passing a M-bit indicator and a Q-bit indicator in a first packet of the incoming packet sequence to the at least one outgoing packet, the M-bit indicator indicating whether the first packet of the incoming packet sequence is a last packet of the incoming packet sequence, and the Q-bit indicator indicating control information in the incoming packet sequence;
the router enabling RBP Q-bit support.

* * * * *